H. G. FREEMAN.
JUNCTION BOX FOR CABLE SPLICES.
APPLICATION FILED NOV. 10, 1916.
1,300,213.
Patented Apr. 8, 1919.
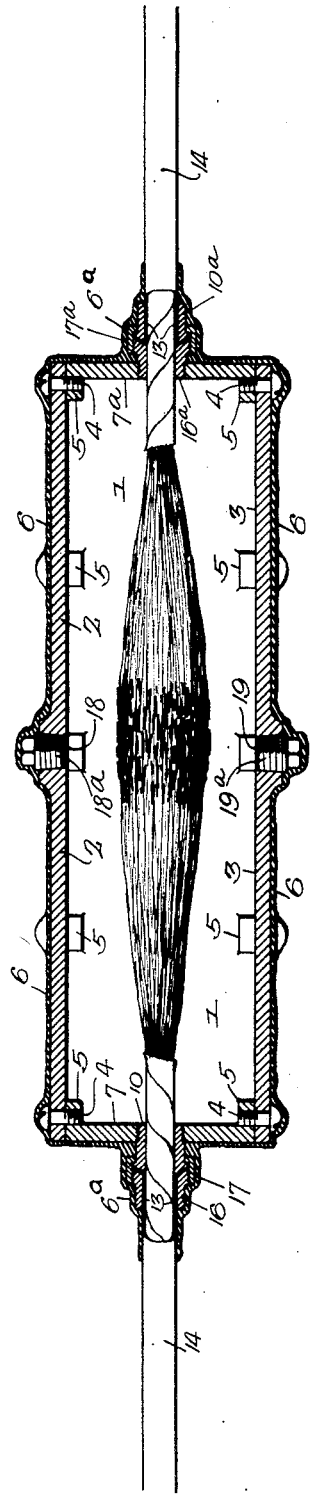
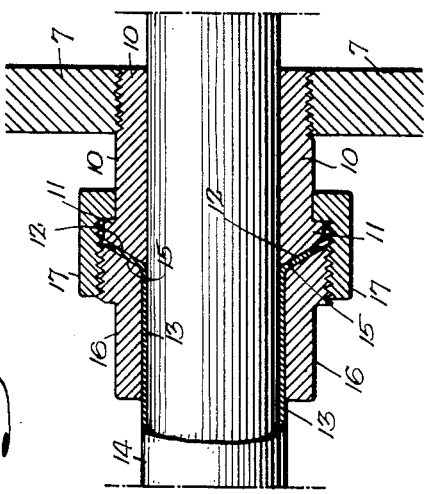
Inventor—
Harry G. Freeman.
by his Attorneys—
Howson & Howson

UNITED STATES PATENT OFFICE.

HARRY G. FREEMAN, OF ATLANTIC CITY, NEW JERSEY, ASSIGNOR OF ONE-HALF TO WILLIAM H. BARTLETT, OF ATLANTIC CITY, NEW JERSEY.

JUNCTION-BOX FOR CABLE-SPLICES.

1,300,213.　　　　Specification of Letters Patent.　　Patented Apr. 8, 1919.

Application filed November 10, 1916. Serial No. 130,594.

*To all whom it may concern:*

Be it known that I, HARRY G. FREEMAN, a citizen of the United States, and a resident of Atlantic City, Atlantic county, New Jersey, have invented certain Improvements in Junction-Boxes for Cable-Splices, of which the following is a specification.

My invention relates to means or devices designed for facilitating the connection of electric cables with junction-boxes, and particularly the connection of underground, lead-covered cables with subway and other boxes usually placed in manholes or passages beneath the surface of the ground. Such connections must be strong; they must be water-tight, and they must be properly and sufficiently insulated to insure against loss of current.

A further feature of my invention is to provide a simple connection in the form of a union coupling for attaching the cable ends to the box, in which the lead sheath of the cable is flanged and utilized as packing means between the sections of the union coupling.

These and other features of my invention are more fully described hereinafter, reference being had to the accompanying drawings, in which:

Figure 1, is a sectional elevation showing the employment of union couplings for attaching lead-covered cables to junction-boxes in accordance with my invention, and Figs. 2 and 3, are enlarged sectional views illustrating parts of the structure shown in Fig. 1, in greater detail.

In making connections with the ends of lead-covered cables, it is necessary to provide means for fully protecting the uncovered portion adjacent the ends of the same, and I propose to employ a junction-box to receive the meeting ends of the cables; the separate wires of which are then connected and the connections disposed within such junction-box. The usual practice has been to strip the ends of the lead-covered cables for a distance sufficient to bare the wires for a length sufficient to enable them to be connected; join the wires; place an enlarged sheath over the joined wires, and then to solder the sheath fast to the lead cover of the cables so as to prevent access of moisture to the wires or their connections, or leakage of current. This is objectionable for many reasons, and the use of junction-boxes is supplanting the same.

My invention comprehends the use of a junction-box, to which the lead-covered cables are attached in a special manner as hereinafter described.

In the accompanying drawings, 1 represents a junction-box structure, usually of metal, which may be approximately two feet long by six inches square, or any other dimensions which may be convenient or desirable, having a removable top 2, and a removable bottom 3; such sections being secured to the box by screws 4 adapted to bosses 5. Such box is usually covered with an asphaltic or bituminous coating, indicated at 6, to protect the metal from corrosion or destruction due to dampness or oxidation. The opposite ends 7 and 7ª of the box, as arranged in accordance with my invention, are provided with union couplings which receive the ends of the lead-covered cables. In attaching these union couplings to the box, it makes no difference which portion of the same is secured to the shell, and the drawing shows one portion of such form of coupling attached to one end of the box and the opposite portion of such form of coupling attached to the opposite end of the box.

As illustrated at the left-hand side of Fig. 1, and in the enlarged section, Fig. 2, the nipple 10 is threaded into the wall 7 of the junction-box. Such nipple is of the ordinary construction, with a flange 11 having a beveled face 12, and the lead covering 13 of the cable 14 is stripped for a certain distance, and then the end of the same is formed into a flange 15 to engage the surface of the beveled end of the nipple. The externally threaded member 16 of the coupling is then brought into engagement with the flange 15 of the lead cover lying against the flange of the nipple, and then the outer internally threaded sleeve 17 is drawn up on the member 16; gripping the sections of the union together and firmly clamping said flange 15 of the lead-covered cable between the nipple and the member 16. A fluid- and moisture-tight joint is thereby insured, and one that will not leak current.

At the opposite or right-hand side of the junction-box, and as shown in the enlarged view, Fig. 3, I have illustrated a union in which the parts are reversely connected;

the externally threaded member 16ª being threaded into the wall 7ª of the junction-box, while the internally threaded outer sleeve 17ª engages the rear wall of the nipple flange and holds the latter against the flange 15ª of the lead covering of the cable and in contact with the surface of the member 16ª.

After the wires of the respective cable ends have been connected, it is usual to boil the box in paraffin to insure the removal of all moisture and to serve as an additional protection for the joined wires. For this purpose, the junction-box is provided with drainage holes or outlets 18 and 19, in the top and bottom plates, respectively, through which the paraffin may be entered and discharged; such holes being finally closed by plugs 18ª and 19ª.

As may be well understood, the union connections at the end walls 7 and 7ª of the junction-box may be covered with asphaltic or bituminous material to further insure against access of moisture or leakage of electric current, as indicated at 6ª, in Fig. 1.

It will be understood, of course, that any form of electrical conducting media may be disposed within the lead sheath, and such conducting media may be in the form of single wires, pairs of wires, or a plurality of fine wires such as are employed in telephone cables.

While the drawing shows a pair of cables connected with the junction-box it will be understood that a single cable might be introduced at one end or portion and the wires of the same connected to a plurality of cables connected to the ends or sides of the box by the means illustrated.

I claim:

1. As a new article of manufacture, a junction-box for cable splices comprising a shell having integral sides and ends and open top and bottom, detachable plates for closing the top and bottom of such shell, means for securing said plates in place; said box having apertures for the introduction and discharge of a body of molten waterproof material, plugs for closing said apertures; the walls of said box being apertured for the reception of couplings through which the cables to be spliced may be passed and whereby said cables may be retained in position, and a waterproof coating covering the entire box and the top and bottom plates and the cable connections.

2. As a new article of manufacture, a junction-box for cable splices comprising a shell of substantially uniform cross section having integral sides and ends and open top and bottom, detachable plates for closing the top and bottom of such shell; the latter having internal bosses, screws adapted to enter said bosses for securing the top and bottom plates in place; said box having apertures for the introduction and discharge of a body of paraffin, plugs closing said apertures; the walls of said box having threaded apertures for the reception of couplings through which the cables to be spliced may be passed and whereby said cables may be retained in position, and a waterproof coating covering the entire box and the top and bottom plates and the cable connections.

3. The combination in a junction-box for cable splices, of a suitable shell having permanent sides and ends; the latter having threaded openings, detachable plates for closing said shell, screws for securing the plates to the shell; the latter having internally disposed bosses for the reception of said screws; said plates having apertures for the inlet and discharge of an internal coating material, detachable plugs for closing the apertures in the plates, and a waterproof coating of asphaltic or bituminous material wholly covering the junction-box and the members attached thereto.

HARRY G. FREEMAN.